US008552078B2

(12) United States Patent
Vedage et al.

(10) Patent No.: US 8,552,078 B2
(45) Date of Patent: Oct. 8, 2013

(54) CROSSLINKERS FOR IMPROVING STABILITY OF POLYURETHANE FOAMS

(75) Inventors: Gamini Ananda Vedage, Bethlehem, PA (US); Juan Jesus Burdeniuc, Colmar, PA (US); Allen Robert Arnold, Jr., Catasauqua, PA (US); James Douglas Tobias, Center Valley, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 11/582,178

(22) Filed: Oct. 17, 2006

(65) Prior Publication Data

US 2008/0090922 A1    Apr. 17, 2008

(51) Int. Cl.
    *C08G 18/00*    (2006.01)
    *C08G 18/08*    (2006.01)
    *C08G 18/18*    (2006.01)

(52) U.S. Cl.
    USPC .............................. 521/163; 521/170; 528/53

(58) Field of Classification Search
    USPC .......................................... 521/170, 163, 53
    See application file for complete search history.

(56) References Cited

U.S. PATENT DOCUMENTS

| | | | |
|---|---|---|---|
| 2,267,204 A | 12/1941 | Kyrides | |
| 2,356,079 A | 8/1944 | Nelles et al. | |
| 2,930,824 A | 3/1960 | Sundholm | |
| 2,998,399 A | 8/1961 | Petropoulos | |
| 3,440,223 A | 4/1969 | Pierce | |
| 3,849,360 A | 11/1974 | Farah et al. | |
| 4,007,140 A * | 2/1977 | Ibbotson ................... | 521/164 |
| 4,108,842 A | 8/1978 | Konig et al. | |
| 4,210,728 A | 7/1980 | Patton, Jr. et al. | |
| 4,238,581 A | 12/1980 | White | |
| 4,248,756 A | 2/1981 | Konig et al. | |
| 4,293,687 A | 10/1981 | Weissel et al. | |
| 4,394,491 A | 7/1983 | Hoffman | |
| 4,399,307 A | 8/1983 | Shioyama | |
| 4,503,249 A | 3/1985 | Nowack et al. | |
| 4,644,017 A * | 2/1987 | Haas et al. ................... | 521/129 |
| 4,698,410 A | 10/1987 | Straehle et al. | |
| 4,722,942 A | 2/1988 | Nichols et al. | |
| 4,722,946 A | 2/1988 | Hostettler | |
| 4,910,230 A | 3/1990 | Tamano et al. | |
| 5,006,501 A | 4/1991 | Tamano et al. | |
| 5,039,713 A | 8/1991 | Petrella | |
| 5,168,009 A | 12/1992 | Petrella et al. | |
| 5,173,516 A | 12/1992 | Vratsanos | |
| 5,229,430 A | 7/1993 | Tamano et al. | |
| 5,252,624 A | 10/1993 | Milliren et al. | |
| 5,426,157 A | 6/1995 | Starner et al. | |
| 5,470,890 A | 11/1995 | House et al. | |
| 5,480,905 A | 1/1996 | Koda et al. | |
| 5,520,968 A | 5/1996 | Wynne et al. | |
| 5,548,056 A | 8/1996 | Chung | |
| 5,549,841 A | 8/1996 | Kinkelaar et al. | |
| 5,594,040 A | 1/1997 | Gerber et al. | |
| 5,674,920 A | 10/1997 | Obata et al. | |
| 5,718,856 A | 2/1998 | Kinkelaar et al. | |
| 5,877,227 A | 3/1999 | Murty | |
| 5,977,198 A | 11/1999 | Hettel et al. | |
| 6,068,790 A | 5/2000 | Postema et al. | |
| 6,087,410 A | 7/2000 | Falke et al. | |
| 6,228,899 B1 | 5/2001 | Wetterling et al. | |
| 6,232,356 B1 * | 5/2001 | Mercando et al. ............ | 521/129 |
| 6,596,663 B1 | 7/2003 | Tamano et al. | |
| 6,660,783 B2 | 12/2003 | Arlt et al. | |
| 2004/0132850 A1 * | 7/2004 | Burdeniuc .................... | 521/155 |
| 2008/0015273 A1 * | 1/2008 | Burdeniuc et al. ............ | 521/118 |

FOREIGN PATENT DOCUMENTS

| | | |
|---|---|---|
| DE | 197 36 976 | 3/1999 |
| EP | 0 731 120 A | 11/1996 |
| EP | 0 872 501 A2 | 10/1998 |
| EP | 0 884 338 A | 12/1998 |
| EP | 0 903 362 A | 3/1999 |
| EP | 1 018 525 A1 | 7/2000 |
| EP | 0 872 501 B1 | 7/2004 |
| JP | 2041310 A | 2/1990 |
| JP | 02-041310 * | 9/1990 |
| WO | 95/15990 | 6/1995 |
| WO | 01/58976 A1 | 8/2001 |
| WO | 03/016372 A1 | 2/2003 |
| WO | 03/016373 A1 | 2/2003 |
| WO | 03/055930 A1 | 7/2003 |
| WO | 2004/060956 A1 | 7/2004 |

OTHER PUBLICATIONS

Kaushiva, B.D., et al; "Influence of Diethanolamine (DEOA) on Structure-Property Behavior of Molded Flexible Polyurethane Foams"; Journal of Applied Polymer Science; vol. 77; 2000; pp. 202-216.
Dounis, D.V., et al; "Influence of Diethanolamine on Hard Segment Ordering in Flexible Polyurethane Foams"; Journal of Applied Polymer Science; vol. 65; 1997 pp. 525-539.
Brasington, et al.; Handbook of the 35th Annual Polyurethane Technical/Marketing Conference; 1994; pp. 261-266.
Skorpenske, et al.; Handbook of the 34th Annual Polyurethane Technical/Marketing Conference; 1992; pp. 650-658.
Broos, et al.; Journal of Cellular Plastics; vol. 36, No. 5; 2000.

* cited by examiner

*Primary Examiner* — Liam Heincer
(74) *Attorney, Agent, or Firm* — Michael K. Boyer

(57) ABSTRACT

A composition for making a polyurethane foam includes a non-fugitive tertiary amine urethane catalyst and an alkylated polyamine crosslinking additives. Foams prepared from the reaction of a polyol and an organic isocyanate in the presence of these ingredients show improved resistance to deterioration of physical properties upon humid ageing.

21 Claims, No Drawings

US 8,552,078 B2

CROSSLINKERS FOR IMPROVING STABILITY OF POLYURETHANE FOAMS

FIELD OF THE INVENTION

This invention relates to polyurethane foams. More particularly, it relates to crosslinker additives for improving the stability of polyurethane foams under humid aging conditions.

BACKGROUND OF THE INVENTION

Polyurethane foams are widely known and used in automotive, housing and other industries. Such foams are produced by reaction of a polyisocyanate with a polyol in the presence of a catalyst, typically a tertiary amine. Unfortunately, tertiary amine catalysts are usually malodorous and offensive, and many have high volatility due to their low molecular weight. To overcome this problem, polyurethane manufacturers have sought to achieve near zero amine emissions by using "non-fugitive" tertiary amine catalysts, which remain in the foam during and after formation. The retention is typically due to either low volatility or to reaction with other components of the composition. The latter variety typically remain in the foam due to the presence of an isocyanate-reactive group such as a primary or secondary amine, a hydroxyl, or other reactive group that ties them to the foam. Whether due to low volatility or by reaction with the polyurethane, use of non-fugitive tertiary amine catalysts greatly reduces amine emissions from the polyurethane, but has the unfortunate effect of reducing the stability of the polyurethane under humid aging conditions. For example, foams based on 4,4'-diphenylmethane diisocyanate (MDI) may barely meet typical specification requirements after humid aging, and foams based on toluene diisocyanate (TDI) may completely fail to meet specifications. In general, foams made with any tertiary amine catalyst that remains in the foam tend to exhibit poor humid aged physical properties. Such deterioration may be so severe as to make the foams unsuitable for use, for instance in automotive applications. Therefore, it would be desirable to overcome performance deterioration in polyurethane foams made with non-fugitive tertiary amine catalysts.

U.S. Pat. No. 5,173,516 discloses the preparation of high resiliency polyurethane foams characterized by high strength and load bearing properties.

U.S. Pat. No. 6,660,783 also discloses the preparation of high resilient flexible slabstock polyurethane foams having improved aging resistance to heat and moisture, in particular improved wet compression set (WCS) and humid aged compression set (HACS), and having sufficient rigidity.

U.S. Pat. No. 4,210,728 discloses a reactive polyol composition useful in the preparation of high resilient polyurethane foams comprising a polyol and from 0.5 to 5.0 wt % of a reactive cycloaliphatic diamine.

SUMMARY OF THE INVENTION

In one aspect, the invention provides a method of making a polyurethane foam. The method comprises combining a polyol component, an organic isocyanate, a non-fugitive tertiary amine urethane catalyst, and a particular crosslinking additive composition. In this aspect the crosslinking additive composition comprises one or more compounds of the following formula A:

            A in which
R is a C1-C18 alkyl, substituted alkyl, alkenyl, substituted alkenyl, aryl, substituted aryl or alkylaryl group;
R' each is independently a hydrogen or R;
m is 2 or 3; and
n is an integer from 1 to 10.

In another aspect, the invention provides a composition comprising a non-fugitive tertiary amine urethane catalyst and at least one crosslinker according to formula (A) as defined above. A polyol component may be included in the composition, which composition optionally may also include one or more blowing agents, additional crosslinkers, additional urethane catalysts, and surfactants.

In yet another aspect, the crosslinking additive composition for use in the above inventive aspects comprises the reaction product of an aldehyde or a ketone and a polyethylene polyamine or polypropylene polyamine under hydrogen pressure in the presence of a hydrogenation catalyst.

DETAILED DESCRIPTION OF THE INVENTION

The invention relates to crosslinking additive compositions for making polyurethane foams. The compositions include at least one compound, shown below as formula A, or the compositions can be obtained by the reaction of an aldehyde or a ketone with a polyethylene or polypropylene polyamine under hydrogen pressure in the presence of a hydrogenation catalyst. The applicants have found that the inclusion of one or more of these crosslinking additives serves to reduce or eliminate deterioration under humid aging conditions of polyurethane foams made using non-fugitive tertiary amine urethane catalysts. The crosslinking additive compounds may be used in conjunction with conventional non-fugitive tertiary amine catalyst compositions under otherwise conventional conditions to make polyurethane foams, i.e., making foams that contain tertiary amine functionality resulting from the use of such catalysts. The foams are made by combining at least one isocyanate compound, at least one polyol compound, and at least one non-fugitive tertiary amine catalyst composition in the presence of the defined crosslinking additive composition. A blowing agent is usually included, but need not be.

As used herein, the term "crosslinking additive" means a compound or mixture of compounds according to formula (A) below or the reaction product of an aldehyde or a ketone with a polyethylene or polypropylene polyamine under hydrogen pressure in the presence of a hydrogenation catalyst.

Suitable for use in the invention would be N-substituted polyamines of formula A:

            A in which
R is a C1-C18 alkyl, substituted alkyl, alkenyl, substituted alkenyl, aryl, substituted aryl or alkylaryl group; preferably comprising 6 to 18 carbon atoms;
R' each independently is a hydrogen atom or R;
m is 2 or 3; and
n is an integer from 1 to 10.

It is preferred that the crosslinking N-substituted polyamine compounds have the following formula A1:

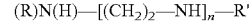            A1 where
R is a C6-C18 alkyl, substituted alkyl, alkenyl, substituted alkenyl, aryl, substituted aryl or alkylaryl group; in particular C6-C12 alkyl or alkylaryl groups;

R' is a hydrogen atom or a R, especially hydrogen; and
n is an integer from 1 to 6; especially 2 to 5.

The crosslinking additives are prepared by reacting an aldehyde or a ketone and a suitable polyamine in the appropriate molar ratios at elevated temperatures of from 80° C. to 300° C., preferably 100° C. to 200° C. under hydrogen pressure and in the presence of a hydrogenation catalyst as well known in the art. The crosslinkers of this invention are prepared by placing the corresponding amine in the reactor together with a hydrogenation catalyst, typically 5% Pd/C at 1% weight loading relative to the mass of the amine, and about 54 atm (~800 psig) hydrogen pressure at 120° C. The corresponding aldehyde or ketone is then pumped into the reactor over a period of 0.5 to 5.0 hours in an amount corresponding to the desired stoichiometry of the final product.

Examples of suitable polyamines include, but are not limited to, ethylenediamine (EDA), diethylenetriamine (DETA), triethylenetetramine (TETA), tetraethylenepentamine (TEPA), pentaethylenehexamine (PEHA), hexaethyleneheptamine, propylenediamine, dipropylenetriamine, tripropylenetetramine, tetrapropylenepentamine, pentapropylenehexamine, hexapropyleneheptamine and the like. EDA, DETA, TETA and TEPA are especially desired for making the crosslinkers.

Examples of aldehydes include, but are not limited to, benzaldehyde, 4-methylbenzaldehyde, 2-methylbenzaldehyde, 3-methylbenzaldehyde, 4-methoxybenzaldehyde, 2-methoxybenzaldehyde, 3-methoxybenzaldehyde, cinnamaldehyde, vanillin, formaldehyde, acetaldehyde, propanal, 2-methylpropanal, 2-methylbutanal, glutaraldehyde, phenylacetaldehyde, salicylaldehyde, butanal, pentanal, hexanal, heptanal, octanal, 2-ethylhexanal, nonanal, decanal, undecanal, dodecanal, and the like. Examples of ketones includes, but are not limited to acetone, methylethyl ketone, methylpropyl ketone, methylisopropyl ketone, methylbutyl ketone, methylisobutyl ketone, diacetone alcohol, phenylmethyl ketone, methylamyl ketone, diisobutyl ketone, isobutylheptyl ketone, methylvinyl ketone, methylisopropenyl ketone, mesityl oxide, isophorone, cyclohexanone, acetophenone, propiophenone, benzophenone, 2,4-pentadione, diphenylethanedione, methylisoamyl ketone, methylisobutyl ketone, diethyl ketone and the like.

Unless otherwise specified, alkyl and alkenyl groups described herein are intended to include all structural isomers, linear or branched, of a given structure; for example, all enantiomers and all diasteriomers are included within this definition. As an example, unless otherwise specified, the term propyl is meant to include n-propyl and iso-propyl, while the term butyl is meant to include n-butyl, isobutyl, t-butyl, sec-butyl, and so forth. Similarly, substituted alkyl, alkenyl, aryl, and alkylaryl groups described herein are intended to include substituted analogs of a given structure. For example, the substituents on alkyl, alkenyl, aryl, and alkylaryl groups can include, but are not limited to, halides; hydroxyl groups; amino groups; alkoxy, alkylamino, or dialkylamino groups having up to 10 carbon atoms; or combinations thereof.

Non-limiting examples of alkyl groups include methyl, ethyl, propyl, butyl, pentyl, hexyl, methylisoamyl, heptyl, octyl, 2-ethylhexyl, nonyl, or decyl, and the like. Examples of alkenyl groups within the scope of the present invention include, but are not limited to, ethenyl, propenyl, butenyl, pentenyl, hexenyl, heptenyl, octenyl, nonenyl, decenyl, and the like. Aryl and alkylaryl (alkylaryl is defined as an aryl-substituted alkyl or arylalkyl) groups include phenyl, alkyl-substituted phenyl, naphthyl, alkyl-substituted naphthyl, and the like. For example, non-limiting examples of aryl and alkylaryl groups useful in the present invention include, but are not limited to, phenyl, tolyl, benzyl, dimethylphenyl, trimethylphenyl, phenylethyl, phenylpropyl, phenylbutyl, propyl-2-phenylethyl, and the like.

Representative of partially alkylated diamines and polyamines for use as crosslinkers in the invention for improving the stability of polyurethane foam and in particular improving the foam stability under humid aging conditions of TDI based polyurethane foams are the following compounds:

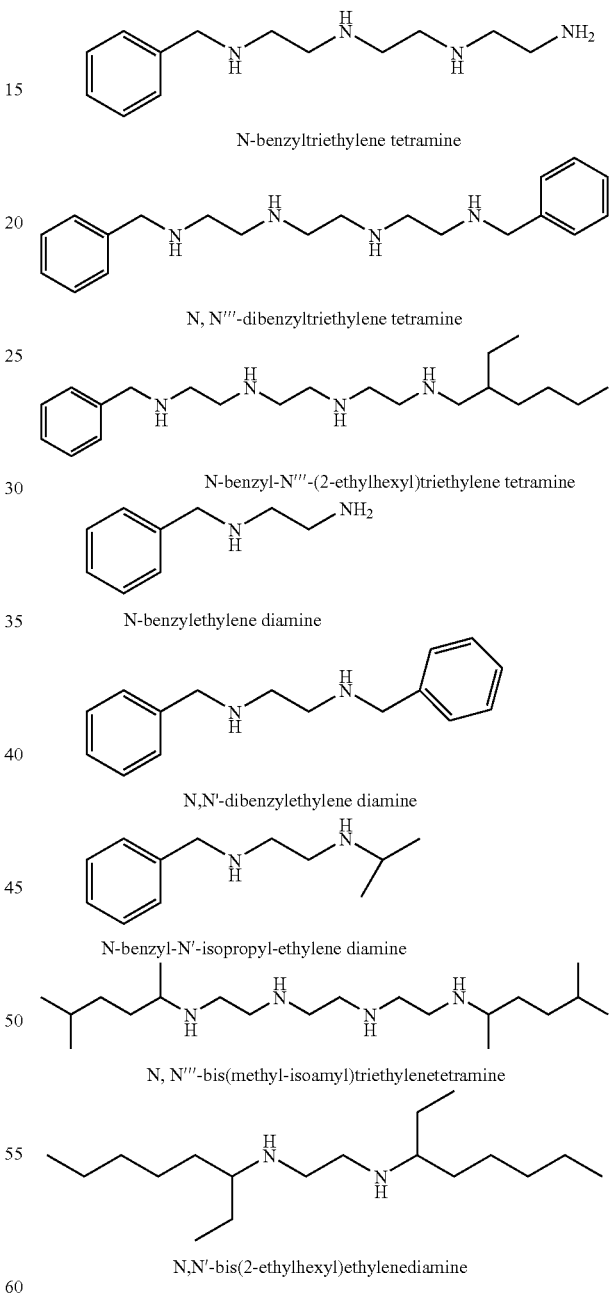

N-benzyltriethylene tetramine

N, N'''-dibenzyltriethylene tetramine

N-benzyl-N'''-(2-ethylhexyl)triethylene tetramine

N-benzylethylene diamine

N,N'-dibenzylethylene diamine

N-benzyl-N'-isopropyl-ethylene diamine

N, N'''-bis(methyl-isoamyl)triethylenetetramine

N,N'-bis(2-ethylhexyl)ethylenediamine

Other suitable crosslinkers include N-(methylisoamyl)ethylenediamine, N-(benzyl)ethylenediamine, N-(2-ethylhexyl) ethylenediamine, N-(isopropyl)ethylenediamine, N-(4-methylbenzyl)ethylenediamine, N-(3-methylbenzyl) ethylenediamine, N-(2-methylbenzyl)ethylenediamine, N-(4-methoxybenzyl)ethylenediamine, N-(3-methoxybenzyl)ethylenediamine, N-(2-methoxybenzyl)ethylenediamine, N-(2-methyl propyl)ethylenediamine, N-(2-methylbutyl)ethylenediamine, N-(methyl-propyl)ethylenediamine, N-(sec-butyl)ethylenediamine, N-(sec-phenylethyl)ethylenediamine, N-(tert-butyl)ethylenediamine, N,N'''-bis-(methylisoamyl)triethylenetetramine, N,N'''-bis-(benzyl)triethylenetetramine, N,N'''-bis-(2-ethylhexyl) triethylenetetramine, N,N'''-bis-(isopropyl) triethylenetetramine, N,N'''-bis(4-methylbenzyl) triethylenetetramine, N,N'''-bis-(3-methylbenzyl) triethylenetetramine, N,N'''-bis-(2-methylbenzyl) triethylenetetramine, N,N'''-bis-(4-methoxybenzyl) triethylenetetramine, N,N'''-bis-(3-methoxybenzyl) triethylenetetramine, N,N'''-bis(2-methoxybenzyl) triethylenetetramine, N,N'''-bis-(2-methylpropyl) triethylenetetramine, N,N'''-bis-(2-methylbutyl) triethylenetetramine, N,N'''-bis-(methyl-propyl) triethylenetetramine, N,N'''-bis-(sec-butyl) triethylenetetramine, N,N'''-bis-(sec-phenylethyl) triethylenetetramine, N,N'''-bis-(tert-butyl) triethylenetetramine, N,N'-bis-(methylisoamyl)ethylenediamine, N,N'-bis-(benzyl)ethylenediamine, N,N'-bis-(2-ethylhexyl)ethylenediamine, N,N'-bis-(4-methylbenzyl)ethylenediamine, N,N'-bis-(isopropyl)ethylenediamine, N,N'-bis-(3-methylbenzyl)ethylenediamine, N,N'-bis-(2-methylbenzyl)ethylenediamine, N,N'-bis-(4-methoxybenzyl)ethylenediamine, N,N'-bis-(3-methoxybenzyl)ethylenediamine, N,N'-bis-(2-methoxybenzyl)ethylenediamine, N,N'-bis-(2-methylpropyl)ethylenediamine, N,N'-bis-(2-methylbutyl)ethylenediamine, N,N'-bis-(methylpropyl)ethylenediamine, N,N'-bis-(sec-butyl)ethylenediamine, N,N'-bis-(sec-phenylethyl)ethylenediamine, N,N'-bis-(tert-butyl)ethylenediamine, N-(methylisoamyl)diethylenetriamine, N-(benzyl)diethylenetriamine, N-(2-ethylhexyl)diethylenetriamine, N-(isopropyl)diethylenetriamine, N-(4-methylbenzyl)diethylenetriamine, N-(3-methylbenzyl)diethylenetriamine, N-(2-methylbenzyl)diethylenetriamine, N-(4-methoxybenzyl)diethylenetriamine, N-(3-methoxybenzyl)diethylenetriamine, N-(2-methoxybenzyl)diethylenetriamine, N-(2-methyl propyl)diethylenetriamine, N-(2-methylbutyl)diethylenetriamine, N-(methylpropyl)diethylenetriamine, N-(sec-butyl)diethylenetriamine, N-(sec-phenylethyl)diethylenetriamine, N-(tert-butyl)diethylenetriamine, N,N'-bis-(methyl-isoamyl)-diethylenetriamine, N,N'-bis-(benzyl)diethylenetriamine, N,N'-bis-(2-ethylhexyl)-diethylenetriamine, N,N'-bis-(isopropyl)diethylenetriamine, N,N''-bis-(4-methylbenzyl)diethylenetriamine, N N,N''-bis-(3-methylbenzyl)diethylenetriamine, N,N''-bis-(2-methylbenzyl)diethylenetriamine, N,N''-bis(4-methoxybenzyl)diethylenetriamine, N,N''-bis-(3-methoxybenzyl)diethylenetriamine, N,N''-bis-(2-methoxybenzyl)diethylenetriamine, N,N''-bis-(2-methyl propyl)diethylenetriamine, N,N''-bis-(2-methylbutyl)diethylenetriamine, N,N''-bis-(methylpropyl)diethylenetriamine, N,N''-bis-(sec-butyl)diethylenetriamine, N,N''-bis-(sec-phenylethyl)diethylenetriamine, N,N''-bis-(tert-butyl)diethylenetriamine, N-(methylisoamyl)triethylenetetramine, N-(benzyl)triethylenetetramine, N-(2-ethylhexyl)triethylenetetramine, N-(isopropyl) triethylenetetramine, N-(4-methylbenzyl) triethylenetetramine, N-(3-methylbenzyl) triethylenetetramine, N-(2-methylbenzyl) triethylenetetramine, N-(4-methoxybenzyl) triethylenetetramine, N-(3-methoxybenzyl) triethylenetetramine, N-(2-methoxybenzyl) triethylenetetramine, N-(2-methylpropyl)triethylenetetramine, N-(2-methylbutyl)triethylenetetramine, N-(methylpropyl)triethylenetetramine, N-(sec-butyl) triethylenetetramine, N-(sec-phenylethyl) triethylenetetramine, N-(tert-butyl)triethylenetetramine, N-(methylisoamyl)tetraethylenepentamine, N-(benzyl)tetraethylenepentamine, N-(2-ethylhexyl)tetraethylenepentamine, N-(isopropyl)tetraethylenepentamine, N-(4-methylbenzyl)tetraethylenepentamine, N-(3-methylbenzyl) tetraethylenepentamine, N-(2-methylbenzyl) tetraethylenepentamine, N-(4-methoxybenzyl) tetraethylenepentamine, N-(3-methoxybenzyl) tetraethylenepentamine, N-(2-methoxybenzyl) tetraethylenepentamine, N-(2-methylpropyl) tetraethylenepentamine, N-(2-methylbutyl) tetraethylenepentamine, N-(methylpropyl) tetraethylenepentamine, N-(sec-butyl) tetraethylenepentamine, N-(sec-phenylethyl) tetraethylenepentamine, N-(tert-butyl) tetraethylenepentamine, N,N''''-bis-(methylisoamyl) tetraethylenepentamine, N,N''''-bis-(benzyl) tetraethylenepentamine, N,N''''-bis(2-ethylhexyl) tetraethylenepentamine, N,N''''-bis(isopropyl) tetraethylenepentamine, N,N''''-bis-(4-methylbenzyl) tetraethylenepentamine, N,N''''-bis-(3-methylbenzyl) tetraethylenepentamine, N,N''''-bis-(2-methylbenzyl) tetraethylenepentamine, N,N''''-bis-(4-methoxybenzyl) tetraethylenepentamine, N,N''''-bis-(3-methoxybenzyl) tetraethylenepentamine, N,N''''-bis-(2-methoxybenzyl) tetraethylenepentamine, N,N''''-bis-(2-methyl propyl) tetraethylenepentamine, N,N''''-bis-(2-methylbutyl) tetraethylenepentamine, N,N''''-bis-(methylpropyl) tetraethylenepentamine, N,N''''-bis-(sec-butyl) tetraethylenepentamine, N,N''''-bis-(sec-phenylethyl) tetraethylenepentamine, N,N''''-bis-(tert-butyl) tetraethylenepentamine and mixtures of any of these.

Examples of prefer compounds to be used as crosslinkers N-(isopropyl)ethylenediamine, N-(methylisoamyl)ethylenediamine, N-(benzyl)ethylenediamine, N-(2-ethylhexyl)ethylenediamine, N-(methylisoamyl)ethylenediamine, N-(2-methyl propyl)ethylenediamine, N-(2-methylbutyl)ethylenediamine, N-(methylpropyl)ethylenediamine, N-(sec-butyl)ethylenediamine, N-(sec-phenylethyl)ethylenediamine, N-(tert-butyl)ethylenediamine, N,N'''-bis-(methylisoamyl)triethylenetetramine, N,N'''-bis(benzyl)triethylenetetramine, N,N'''-bis-(2-ethylhexyl)triethylenetetramine, N,N'''-bis(isopropyl)triethylenetetramine, N,N'''-bis-(2-methylpropyl)triethylenetetramine, N,N'''-bis-(2-methylbutyl) triethylenetetramine, N,N'''-bis-(methylpropyl)triethylenetetramine, N,N'''-bis-(sec-butyl)triethylenetetramine, N,N'''-bis-(sec-phenylethyl)triethylenetetramine, N,N'''-bis-(tert-butyl)triethylenetetramine, N,N'-bis-(methylisoamyl)ethylenediamine, N,N'-bis-(benzyl)ethylenediamine, N,N'-bis-(isopropyl)ethylenediamine, N,N'-bis-(2-methylpropyl)ethylenediamine, N,N'-bis-(2-ethylhexyl)ethylenediamine, N,N'-bis-(2-methylbutyl)ethylenediamine, N,N'-bis-(methylpropyl)ethylenediamine, N,N'-bis-(sec-butyl)ethylenediamine, N,N'-bis-(sec-phenylethyl)ethylenediamine, N,N'-bis-(tert-butyl)ethylenediamine, N-(methylisoamyl)diethylenetriamine, N-(benzyl)diethylenetriamine, N-(2-ethylhexyl)diethylenetriamine, N-(isopropyl)diethylenetriamine, N-(2-methylpropyl)diethylenetriamine, N-(2-methylbutyl)diethylenetriamine, N-(methylpropyl)diethylenetriamine, N-(sec-butyl)diethylenetriamine, N-(sec-phenylethyl)diethylenetriamine, N-(tert-butyl)diethylenetriamine, N,N'-bis-(methyl-isoamyl)-diethylenetriamine, N,N'-bis-(benzyl)diethylenetriamine, N,N'-bis-(2-ethylhexyl)

diethylenetriamine, N,N'-bis-(isopropyl)-diethylenetriamine, N,N"-bis-(2-methylpropyl) diethylenetriamine, N,N"-bis-(2-methylbutyl) diethylenetriamine, N,N"-bis-(methylpropyl) diethylenetriamine, N,N"-bis-(sec-butyl)diethylenetriamine, N,N"-bis-(sec-phenylethyl)diethylenetriamine, N,N"-bis-(tert-butyl)diethylenetriamine, N-(methylisoamyl)triethylenetetramine, N-(benzyl)-triethylenetetramine, N-(2-ethylhexyl)triethylenetetramine, N-(isopropyl)-triethylenetetramine, N-(2-methylpropyl) triethylenetetramine, N-(2-methylbutyl) triethylenetetramine, N-(methylpropyl)triethylenetetramine, N-(sec-butyl)triethylenetetramine, N-(sec-phenylethyl)triethylenetetramine, N-(tert-butyl)triethylenetetramine, N-(methylisoamyl)tetraethylenepentamine, N-(benzyl)tetraethylenepentamine, N-(2-ethylhexyl)tetraethylenepentamine, N-(isopropyl)tetraethylenepentamine, N-(2-methylpropyl)tetraethylenepentamine, N-(2-methylbutyl) tetraethylenepentamine, N-(methylpropyl) tetraethylenepentamine, N-(sec-butyl) tetraethylenepentamine, N-(sec-phenylethyl) tetraethylenepentamine, N-(tert-butyl) tetraethylenepentamine, N,N""-bis-(benzyl) tetraethylenepentamine, N,N""-bis-(2-ethylhexyl) tetraethylenepentamine, N,N""-bis(methylisoamyl) tetraethylenepentamine, N,N""-bis(isopropyl) tetraethylenepentamine, N,N""-bis-(2-methylpropyl) tetraethylenepentamine, N,N""-bis-(2-methylbutyl) tetraethylenepentamine, N,N""-bis-(methylpropyl) tetraethylenepentamine, N,N""-bis(sec-butyl) tetraethylenepentamine, N,N""-bis-(sec-phenylethyl) tetraethylenepentamine, N,N""-bis-(tert-butyl) tetraethylenepentamine and mixtures of any of these.

The crosslinker composition can improve foam hardness in conventional and high resilience slabstock foams as well as flexible molded polyurethane foam. The crosslinker composition can also improve the chemical stability of the polyurethane as evidenced by the physical properties measurement of foams that were subjected to humid aging. The invention can be used to produce humid aged stable TDI-based or MDI-based foams made with non-fugitive, or non-emissive, tertiary amine catalysts, i.e. catalysts characterized by very low vapor pressures or by the presence of an isocyanate reactive group.

The amount of crosslinking additive in the polyurethane foam composition should typically be about 0.1 to 5 parts per hundred parts polyol on a weight basis (pphp). More typically, the amount will be 0.2 to 3 pphp, and most typically 0.4 to 2 pphp.

Preparation of Foams

Foams of any of the various types known in the polyurethane art may be made using the methods of this invention, using typical polyurethane formulations to which have been added one or more crosslinking additives according to the invention. For example, flexible polyurethane foams with the improved aging characteristics described herein will typically comprise the components shown in Table A, in the amounts indicated. The components shown in Table A will be discussed in detail later below.

TABLE A

| Polyurethane Components | |
| --- | --- |
| Component | Parts by Weight |
| Base Polyol | 20-100 |
| Polymer polyol | 0-80 |

TABLE A-continued

| Polyurethane Components | |
| --- | --- |
| Component | Parts by Weight |
| Silicone surfactant | 0.5-10 |
| Blowing agent | 2-4.5 |
| Crosslinker | 0.5-2 |
| Catalyst | 0.25-10 |
| Polyisocyanate | To provide NCO index = 70-115 |

The amount of polyisocyanate used in polyurethane formulations according to the invention is not limited, but it will typically be within those ranges known to those of skill in the art. An exemplary range is given in the above table, indicated by reference to "NCO Index" (isocyanate index). As is known in the art, the NCO index is defined as the number of equivalents of isocyanate, divided by the total number of equivalents of active hydrogen, multiplied by 100. The NCO index is represented by the following formula:

NCO index=[NCO/(OH+NH)]×100

Flexible foams typically use copolymer polyols as part of the overall polyol content in the foam composition, along with base polyols of about 4000-5000 weight average molecular weight and hydroxyl number of about 28-35. Base polyols and copolymer polyols will be described in detail later herein.

In some embodiments of the invention, the catalyst and the crosslinking additive may be combined into a package, optionally with one or more polyols, including for example polyether polyols and polyester polyols, and optionally with one or more blowing agents and/or other additives commonly used in polyurethane formation. Examples of these other optional components are listed below, and they do not affect the basic nature of the invention. Such mixtures may subsequently be combined with an organic isocyanate to form a polyurethane foam, again optionally in the presence of other additives known in the art.

In addition to making flexible foams, the invention may also be used to prepare semi-flexible foams, such as are commonly utilized for many applications in the automotive industry (e.g., instrument panels and interior trims).

Although specific exemplary types of polyurethane foams are discussed above and elsewhere herein, it is to be understood that polyurethane foams of any type may be prepared according to the invention.

Catalysts

The catalyst in the compositions of the present invention comprises a non-fugitive tertiary amine. As used herein, the term "non-fugitive tertiary amine" refers to a tertiary amine that also comprises an isocyanate-reactive group such as a primary amine, secondary amine, hydroxyl group, amide or urea, or a tertiary amine that has a high boiling point (typically above 120° C.). In either case, the result is that some or all of the catalyst remains in the foam. As used herein, reference to a tertiary amine catalyst "remaining in the foam" includes catalyst that remains in any form, whether or not it has reacted with any of the other components in the foam or its starting materials.

Non-fugitive tertiary amine catalysts include both gelling and blowing catalysts. Exemplary non-fugitive gelling catalysts include N,N-bis(3-dimethylaminopropyl)-N-isopropanolamine; N,N-dimethylaminoethyl-N'-methyl ethanolamine; N,N,N'-trimethylaminopropyl ethanolamine; N,N-dimethylethanolamine; N,N-dimethyl-N',N'-2-hydroxy(propyl)-1,3-propylenediamine;

dimethylaminopropylamine; (N,N-dimethylaminoethoxy) ethanol; methylhydroxyethylpiperazine, bis(N,N-dimethyl-3-aminopropyl)amine; N,N-dimethylaminopropyl urea; N,N'-bis(3-dimethylaminopropyl)urea; bis(dimethylamino)-2-propanol; N-(3-aminopropyl)imidazole; N-(2-hydroxypropyl)imidazole; and N-(2-hydroxyethyl)imidazole.

Exemplary non-fugitive blowing catalysts include 2-[N-(dimethylaminoethoxyethyl)-N-methylamino]ethanol; dimethylaminoethoxyethanol; N,N,N'-trimethyl-N'-3-aminopropyl-bis(aminoethyl)ether; and N,N,N'-trimethyl-N'-aminopropyl-bis(aminoethyl)ether.

The catalyst may also comprise, in addition to non-fugitive tertiary amines, ones that are highly volatile and not isocyanate-reactive. Suitable volatile gelling catalysts may include, for example, triethylenediamine. Suitable volatile blowing catalysts include, for example, bis-(dimethylaminoethyl) ether, as well as pentamethyldiethylenetriamine and related compositions; higher permethylated polyamines; 2-[N-(dimethylaminoethoxyethyl)-N-methylamino]ethanol and related structures; alkoxylated polyamines; imidazoleboron compositions; or amino propyl-bis(amino-ethyl)ether compositions. The catalyst compositions may also include other components, for example transition metal catalysts such as organotin compounds, for example when the desired polyurethane foam is a flexible slab stock.

Typically, the loading of non-fugitive tertiary amine catalyst(s) for making a foam according to the invention will be in the range of 0.1 to 20 pphp, more typically 0.1 to 10 pphp, and most typically 0.1 to 5 pphp. However, any effective amount may be used. The term "pphp" means wt parts per hundred wt parts polyol.

Organic Isocyanates

Suitable organic isocyanate compounds include, but are not limited to, hexamethylene diisocyanate (HDI), phenylene diisocyanate (PDI), toluene diisocyanate (TDI), and 4,4'-diphenylmethane diisocyanate (MDI). In one aspect of the invention, 2,4-TDI, 2,6-TDI, or any mixture thereof is used to produce polyurethane foams. Other suitable isocyanate compounds are diisocyanate mixtures known commercially as "crude MDI." One example is marketed by Dow Chemical Company under the name PAPI, and contains about 60% of 4,4'-diphenylmethane diisocyanate along with other isomeric and analogous higher polyisocyanates.

Also suitable are "prepolymers" of these isocyanate compounds, comprising a partially pre-reacted mixture of a polyisocyanate and a polyether or polyester polyol to convert one or more hydroxyls on the polyester polyol to substituted carbamate groups. Suitable prepolymers derived from polyether and polyester polyols are well known in the art.

Polyol Component

Polyurethanes are produced by the reaction of organic isocyanates with the hydroxyl groups in a polyol, typically a mixture of polyols. The polyol component of the reaction mixture includes at least a main, or "base" polyol. Base polyols suitable for use in the invention include, as nonlimiting examples, polyether and polyester polyols. The polyalkylene ether polyol includes the poly(alkyleneoxide) polymers such as poly(ethyleneoxide) and poly(propyleneoxide) polymers and copolymers with terminal hydroxyl groups derived from polyhydric compounds, including diols and triols, These include, but are not limited to, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, cyclohexane diol, and sugars such as sucrose and like low molecular weight polyols.

Amine polyether polyols can be used in the present invention. These can be prepared when an amine such as, for example, ethylenediamine, diethylenetriamine, tolylenediamine, diphenylmethanediamine, or triethanolamine is reacted with ethylene oxide or propylene oxide.

In another aspect of the present invention, a single high molecular weight polyether polyol, or a mixture of high molecular weight polyether polyols, such as mixtures of different multifunctional materials and/or different molecular weight or different chemical composition materials can be used.

In yet another aspect of the present invention, polyester polyols can be used, including those produced when a dicarboxylic acid is reacted with an excess of a diol. Non-limiting examples include adipic acid or phthalic acid or phthalic anhydride reacting with ethylene glycol or butanediol. Polyols useful in the present invention can be produced by reacting a lactone with an excess of a diol, for example, caprolactone reacted with propylene glycol. In a further aspect, active hydrogen-containing compounds such as polyester polyols and polyether polyols, and combinations thereof, are useful in the present invention.

In addition to the base polyols described above, or instead of them, materials commonly referred to as "copolymer polyols" may be included in a polyol component for use according to the invention. Copolymer polyols may be used in polyurethane foams to increase the resistance of the foam to deformation, for example to improve the load-bearing properties of the foam. Depending upon the load-bearing requirements for the polyurethane foam, copolymer polyols may comprise from 0 to about 80 percent by weight of the total polyol content. Examples of copolymer polyols include, but are not limited to, graft polyols and polyurea modified polyols, both of which are known in the art and are commercially available.

Blowing Agents

Polyurethane foam production may be aided by the inclusion of a blowing agent to produce voids in the polyurethane matrix during polymerization. Any blowing agent known in the art may be used. Suitable blowing agents include compounds with low boiling points which are vaporized during the exothermic polymerization reaction. Such blowing agents are generally inert and therefore do not decompose or react during the polymerization reaction. Examples of inert blowing agents include, but are not limited to, carbon dioxide, chlorofluorocarbons, hydrogenated fluorocarbons, hydrogenated chlorofluorocarbons, acetone, and low-boiling hydrocarbons such as cyclopentane, isopentane, n-pentane, and their mixtures. Other suitable blowing agents include compounds, for example water, that react with isocyanate compounds to produce a gas.

Other Optional Components

A variety of other ingredients may be included in the formulations for making foams according to the invention. Examples of optional components include, but are not limited to, cell stabilizers, other crosslinking agents, chain extenders, pigments, fillers, flame retardants, auxiliary urethane gelling catalysts, auxiliary urethane blowing catalysts, transition metal catalysts, and combinations of any of these.

Practice of this invention may allow polyurethane manufacturers to realize one or more advantages. These may include a) use of a relatively inexpensive and readily available raw material (TDI) for flex-molded foams while obtaining low or no amine emissions; b) ability to use processing conditions similar to those already in use; c) avoidance in many cases of significant formulation changes (other than addition of the crosslinking additive) because the process can use conventional non-fugitive catalysts; d) use of raw materials well known by the industry; and e) excellent physical properties measured at ambient conditions before and after humid aging.

In the following examples TDI based polyurethane foam formulations were used to evaluate crosslinking additives using conventional tertiary amine catalysts (fugitive or emissive) and reactive tertiary amine catalysts (nonfugitive or non-emissive) in free-rise and molded foams. All foams were tested in accordance to ASTM 3574, ISO 3386-1 Halls, DIN 53571. Two automotive test methodologies were utilized to evaluate humid and heat aged load loss conditions. Methodology A: this methodology consists of a) drying foam at 90° C. for 24 hours, b) placing dry foam in an environmental chamber at 90° C. and 100% relatively humidity for an additional 200 hours, c) place samples in a dry oven at 70° C. and dry them for 22 hours, and d) re-acclimate samples to room temperature for testing. Methodology B: this methodology consists of a) placing the sample in a humid aged chamber at 120° C. (2 bar) for 5.0 hours, b) dry the samples at 70° C. for 3.0 hours, c) repeat a) and b) two times for a total of 3 cycles and d) test the samples after they have re-acclimated at room temperature.

Handmix Free-Rise Bucket Foams

Formulations were blended together for approximately 10 minutes using a mechanical mixer equipped with a 7.6 cm diameter high shear mixing blade, rotating at 5000 rpm. Premixed formulations were maintained at 23±1° C. using a low temperature incubator. Mondur TD-80 (an 80/20 2,4/2,6 isomer blend of TDI) was added to the premix at the correct stoichiometric amount for the reported index of each foam. The mixture was blended together with Premier Mill Corporation Series 2000, Model 89, and dispersator for approximately five seconds. The foaming mixture was transferred to an Imperial Bondware #GDR-170 paper bucket and allowed to free rise while data was recorded.

Machine Molded Foam

Machine runs for the flexible molded foam were conducted on a Hi Tech Sure Shot MHR-50, cylinder displacement series and high-pressure machine. Fresh premixes, consisting of the appropriate polyols, water, crosslinker, surfactants and catalysts for each formulation were charged to the machine. Mondur TD-80 was used throughout the entire study. All chemical temperatures were held at 23±2° C. via the machine's internal temperature control units. Foam pours were made into an isothermally controlled, heated aluminum mold maintained at 63±2° C. The mold was a typical physical property tool designed with internal dimensions of 40.6 cm×40.6 cm×10.2 cm. The mold had five vents, each approximately 1.5 mm in diameter, centered in each corner 10.0 cm from each edge and the geometric center of the lid. The mold was sprayed with a solvent-based release agent, prior to every pour and allowed to dry for one minute before pouring. The foam premix was puddle poured into the center of the mold with a wet chemical charge weight capable of completely filling the mold and obtaining the desired core densities reported. Minimum fill requirements were established for each formulation evaluated. The foam article was demolded at 240 seconds (4 minutes) after the initial pour (detailed in next paragraph). Upon demold, the foam was placed through a mechanical crusher or tested for Force-to-Crush (FTC) measurements (detailed below).

All physical property foams in each catalyst set were mechanically crushed 1 minute after demold using a Black Brothers Roller crusher set to a gap of 2.54 cm. Crushing was conducted three times on each part, rotating the foam 90 degrees after each pass through the rollers. All parts produced for physical testing were allowed to condition for at least seven days in a constant temperature and humidity room (23±2° C., 50±2% relative humidity).

Three to four physical property parts were produced for any given set of conditions. Five test specimens were die-cut from each pad and evaluated for each physical property listed in Tables 2 and 3. All results were included in calculating averages. Each test was conducted as specified in ASTM D-3574.

FTC measurements were conducted 45 seconds after demold. The pad was removed from the mold, weighed and placed in the FTC apparatus. The force detection device is equipped with a 2.2 kg capacity pressure transducer mounted between the 323 cm$^2$ circular plate cross head and the drive shaft. The actual force is shown on a digital display. This device mimics the ASTM D-3574, Indentation Force Deflection Test and provides a numerical value of freshly demolded foam's initial hardness or softness. The pad was compressed to 50% of its original thickness at a cross-head velocity of 275 mm per minute with the force necessary to achieve the highest compression cycle recorded in Newtons. Ten compression cycles were completed. A cycle takes approximately 30 seconds to complete.

Following is a glossary of catalysts used in the Examples.

| Abbreviation | Compound |
|---|---|
| DABCO 33-LV® | Diazabicyclooctane [triethylenediamine (TEDA) 33 wt % in DPG] |
| DABCO® BL-11 | bis-dimethylaminoethyl ether [33 wt % in DPG] |
| Non-fugitive 1 | 75 wt % mixture of mono- and bis-dimethylaminopropyl urea [83:17 wt/wt] in polyethylene glycol |
| Non-fugitive 2 | mixture of N,N,N'-trimethyl-N'-hydroxyethyl-bis-(aminoethyl) ether and dimethylaminopropyl ureas [25:75 wt/wt] |

EXAMPLE 1

This example illustrates the impact of amine alkylation and the ability of the alkylated product to act as an effective crosslinker (or chain extender). If the crosslinker imparts sufficient stability to the foaming mass then the product will be a stable polyurethane foam. If the crosslinker is not effective, then the initially foamed mass will collapse and the product produced will be a polymeric mass without any uniform cell structure. This example shows the performance of polyamines such as ethylenediamine (EDA), triethylenetetramine (TETA) as well as alkylated polyamines such as benzylethylenediamine (Bz-EDA); N,N'-bis(2-ethylhexyl)ethylenediamine (2EH-EDA) and N,N'''-bis(methylisoamyl) triethylenetetramine (MIA-TETA). The free rise test shows whether a particular compound produced stable foam (pass) or instead a collapse of the foaming mass occurred (fail).

The foams produced in this test were made according to Formulation 1 shown below which corresponds to foam density of 31.5 Kg/m$^3$.

| FOAM FORMULATION 1 | |
|---|---|
| Index (Mondur TD80) | 100 |
| Density, Kg/m$^3$ | 31.5 |
| Conventional Polyol, pphp | 72.0 |
| SAN Polyol, pphp | 28.0 |
| DC 5169, pphp | 0.60 |

-continued

FOAM FORMULATION 1

| | |
|---|---|
| DC 5164, pphp | 0.20 |
| Water pphp | 4.10 |
| Crosslinker Additive pphp | See Table 1 |

The qualitative test results in Table 1 show that EDA and TETA were not able to stabilized the polyurethane product yielding foam collapse. However, the alkylated derivatives MIA-TETA, Bz-EDA and 2EH-EDA were able to produce polyurethane foams.

TABLE 1

FOAM DATA ANALYSIS

| | Crosslinker | | | | |
|---|---|---|---|---|---|
| | EDA | TETA | MIA-TETA | Bz-EDA | 2EH-EDA |
| Index | 100 | 100 | 100 | 100 | |
| Density, Kg/m$^3$ | 31.5 | 31.5 | 31.5 | 31.5 | |
| 33 LV* | 0.32 | — | — | — | |
| BL 11* | 0.08 | — | — | — | |
| Non-fugitive 1* | — | 0.38 | 0.38 | 0.38 | |
| Non-fugitive 2* | — | 0.45 | 0.45 | 0.45 | |
| Bucket Foam Results | | | | | |
| pphp/Result | 0.50/Fail | 0.25/Fail | 0.50/Fail | 1.0/Pass | 0.50/Fail |
| | | 0.50/Fail | 0.75/Pass | 1.2/Pass | 1.0/Fail |
| | | | 1.0/Fail | | 1.0/Pass |
| | | | 1.0/Pass | | 1.25/Pass |

*pphp

EXAMPLE 2

The fugitive and non-fugitive catalyst combinations of Formula 1 were used as shown in Table 2. The crosslinkers used were DEOA (diethanolamine), Bz-EDA and MIA-TETA. The amount of catalyst and crosslinker employed and the physical properties of the resulting foam are shown in Table 2.

TABLE 2

FOAM DATA ANALYSIS

| | Formulation Example | | | |
|---|---|---|---|---|
| | 1A | 1B | 1E | 1F |
| Index | 100 | 100 | 100 | 100 |
| Density, Kg/m$^3$ | 31.5 | 31.5 | 31.5 | 31.5 |
| 33 LV* | 0.32 | — | — | — |
| BL 11* | 0.08 | — | — | — |
| Non-fugitive 1* | — | 0.38 | 0.38 | 0.38 |
| Non-fugitive 2* | — | 0.45 | 0.45 | 0.45 |
| DEOA* | 1.50 | 1.50 | — | — |
| Bz-EDA* | — | — | 1.20 | — |
| MIA-TETA* | — | — | — | 1.0 |
| Ambient conditions | | | | |
| AirFlow SLM | 54 | 60 | 57 | 83 |
| Elongation at break, % | 104 | 100 | 194 | 122 |
| Tear Strength, N/m | 220 | 214 | 262 | 229 |
| Comp. Set, 50% | 6 | 9 | 7 | 8 |
| Humid heat aging | | | | |
| Method B HALL, % | −26 | −63 | −34 | −22 |
| Method B Elongation at break, % | 133 | 67 | 113 | 137 |
| Method B Tensile Strength, KPa | 119 | 58 | 79 | 103 |

TABLE 2-continued

FOAM DATA ANALYSIS

| | Formulation Example | | | |
|---|---|---|---|---|
| | 1A | 1B | 1E | 1F |
| HACS, 50% | 10 | 29 | 12 | 27 |
| HACS, 50% Method A | 13 | 28 | 11 | 21 |
| HACS, 50% Method A | | | 6 | 36 |

*pphp

The data in Table 2 indicates that physical properties deteriorate when a conventional fugitive (or non-isocyanate reactive) catalyst combination (Dabco 33 LV and Dabco BL11 catalysts) was replaced by a non-fugitive (or isocyanate reactive) combination. Thus, humid aged elongation decreased from 133 KPa to 67 KPa when switching from conventional catalysts combination (non-isocyanate reactive) to a non-fugitive catalyst combination (isocyanate reactive). Similar results were observed for humid aged tensile strength, 50% humid aged compression set (50% HACS) and humid aged load loss (HALL).

Using the alkylated polyamine crosslinkers showed that it was possible to use a non-fugitive catalyst combination and obtain a foam product with significantly improved physical properties as evidenced by the measured humid aged tensile, humid aged elongation, HACS and HALL.

EXAMPLE 3

Table 3 shows the physical properties measured on polyurethane foam made according to Formulation 1 using standard fugitive amine catalysts and non-fugitive catalysts with DEOA, 2EH-EDA and Bz-EDA as crosslinkers.

TABLE 3

FOAM DATA ANALYSIS

| | Formulation Example | | | |
|---|---|---|---|---|
| | 1A | 1B | 1E | 1F |
| Index | 100 | 100 | 100 | 100 |
| Density, Kg/m$^3$ | 31.5 | 31.5 | 31.5 | 31.5 |
| 33 LV* | 0.32 | — | — | — |
| BL 11* | 0.08 | — | — | — |
| Non-fugitive 1* | — | 0.38 | 0.38 | 0.30 |
| Non-fugitive 3* | — | 0.45 | 0.45 | 0.60 |
| DEOA* | 1.50 | 1.50 | 1.50 | 1.50 |
| 2EH-EDA* | — | — | 1.20 | — |
| Bz-EDA* | — | — | — | 1.0 |
| Ambient conditions | | | | |
| AirFlow SLM | 54 | 60 | 79 | 77 |
| Elongation at break, % | 104 | 100 | 118 | 92 |
| Tear Strength, N/m | 220 | 214 | 215 | 259 |
| Comp. Set, 50% | 6 | 9 | 9 | 11 |
| Humid heat aging | | | | |
| Method B HALL, % | −26 | −63 | −22 | −27 |
| Method B Elongation at break, % | 133 | 67 | 132 | 116 |
| Method B Tensile Strength, KPa | 119 | 58 | 93 | 69 |
| HACS, 50% | 10 | 29 | 15 | 25 |
| HACS, 50% Method B | 13 | 28 | 9 | 26 |
| HACS, 50% Method A | | | 29 | 10 |

*pphp

As in Example 2, using 2EH-EDA and Bz-EDA allowed the use of non-fugitive (isocyanate reactive) catalysts in the preparation of polyurethane foams manifesting good humid aged physical properties.

EXAMPLE 4

Benzylethylenediamine (Bz-EDA) was prepared by placing 250 g of ethylenediamine (4.16 moles) and 2.5 g of 5% Pd/C catalysts were placed in a stainless steel reactor under hydrogen pressure (800 psig) at 120° C. Benzaldehyde (441.7 g, 4.16 moles) were pumped inside the reactor over a period of an hour. The reaction was allowed to proceed for an extra hour. The reactor was then cooled down, the catalyst was removed by filtration to give the corresponding product.

The other crosslinkers can be similarly prepared.

We claim:

1. A foamable composition comprising: at least one polyol compound, at least one catalyst comprising N, N, N'trimethyl-N'hydroxyethyl-bis-(aminoethyl)ether and dimethylaminopropyl urea, and at least one crosslinking additive comprising one or more polyamine compounds of formula A:

(R)N(R')—[(CH$_2$)$_m$—NR']$_n$—R'    A in which R is a C1-C18 alkyl, alkenyl, aryl, or alkylaryl group;

R' each is independently a hydrogen or R;

m is 2 or 3; and n is an integer from 1 to 10.

2. The composition of claim 1 wherein the crosslinking additive comprises the reaction product of an aldehyde or a ketone and a polyamine which is at least one of ethylenediamine (EDA), diethylenetriamine (DETA), triethylenetetramine (TETA), tetraethylenepentamine (TEPA), pentaethylenehexamine (PEHA), hexaethyleneheptamine, propylenediamine, dipropylenetriamine, tripropylenetetramine, tetrapropylenepentamine, pentapropylenehexamine or hexapropyleneheptamine.

3. The composition of claim 2 wherein the polyamine is ethylenediamine (EDA), diethylenetriamine (DETA), triethylenetetramine (TETA), tetraethylenepentamine (TEPA), or pentaethylenehexamine (PEHA).

4. The composition of claim 1 wherein the amount of the catalyst in the foamable composition is about 0.1 to about 20 parts per hundred polyol on a weight basis and the amount of crosslinking additive in the foamable composition is about 0.1 to 5 parts per hundred parts polyol on a weight basis.

5. A method of making a flexible polyurethane foam, the method comprising:

combining the composition of claim 1 and at least one blowing agent, contacting the combination with an amount of at least one organic polyisocyanate to provide an NCO index from about 70 to about 115, and recovering the foam.

6. The method of claim 5, wherein the organic polyisocyanate is a prepolymer comprising a partially pre-reacted mixture of a polyisocyanate and a polyether or polyester polyol to convert one or more hydroxyls on the polyester polyol to substituted carbamate groups.

7. The method of claim 5, wherein the polyurethane foam has an increased elongation strength at break after humid heat aging when measured using Methodology A and Methodology B in comparison to a polyurethane foam made with non-fugitive tertiary amine and diethanolamine.

8. The method of claim 5 wherein the at least one organic polyisocyanate comprises toluene diisocyanate.

9. The composition method of claim 5 wherein the crosslinking additive comprises N-(benzyl)ethylenediamine.

10. The method of claim 5 wherein the cross-linking additive comprises N,N'''-bis(methylisoamyl)triethylenetetramine.

11. The method of claim 5 wherein the cross-linking additive comprises N,N'-bis(2-ethylhexyl)ethylenediamine.

12. The method of claim 5 wherein the polyol component has an average molecular weight of about 4000 to 5000 and the foam comprises a flexible foam.

13. A composition for use in making polyurethane foams comprising at least one non-fugitive tertiary amine urethane catalyst comprising N,N,N'trimethyl-N'hydroxyethyl-bis-(aminoethyl)ether and dimethylaminopropyl urea, at least one polyol, and at least one crosslinking additive comprising at least one member selected from the group consisting of N-(benzyl)ethylenediamine, N,N'-bis(2-ethylhexyl)ethylenediamine and N,N'''-bis(methylisoamyl)triethylenetetramine.

14. The composition of claim 13 wherein the polyol comprises a polyester or polyether polyol.

15. The composition of claim 13 wherein the crosslinking additive comprises the reaction product of an aldehyde or a ketone and a polyamine which is at least one of ethylenediamine (EDA), diethylenetriamine (DETA), triethylenetetramine (TETA), tetraethylenepentamine (TEPA), pentaethylenehexamine (PEHA), hexaethyleneheptamine, propylenediamine, dipropylenetriamine, tripropylenetetramine, tetrapropylenepentamine, pentapropylenehexamine or hexapropyleneheptamine.

16. The composition of claim 15 wherein the polyamine is diethylenetriamine (DETA), triethylenetetramine (TETA), tetraethylenepentamine (TEPA), or pentaethylenehexamine (PEHA).

17. The composition of claim 13 wherein the crosslinking additive comprises N-(benzyl)ethylenediamine.

18. The composition of claim 13 wherein the crosslinking additive comprises N,N'-bis(methylisoamyl)triethylenetetramine.

19. The composition of claim 13 wherein the crosslinking additive comprises N,N'''-bis(2-ethylhexyl)ethylenediamine.

20. The composition of claim 13 further comprising at least one surfactant.

21. The composition of claim 13 further comprising at least one blowing agent comprising water.

* * * * *